Aug. 4, 1953  W. D. TEAGUE, JR  2,647,730
OIL COOLER PROTECTIVE MEANS
Filed July 22, 1949

INVENTOR.
WALTER D. TEAGUE JR.
BY
*Herbert L. Davis, Jr.*
ATTORNEY

Patented Aug. 4, 1953

2,647,730

UNITED STATES PATENT OFFICE 2,647,730

OIL COOLER PROTECTIVE MEANS

Walter D. Teague, Jr., Alpine, N. J., assignor to Bendix Aviation Corporation, Teterboro, N. J., a corporation of Delaware Application July 22, 1949, Serial No. 106,222

6 Claims. (Cl. 257—2)

The present invention relates to means for protecting the oil supply in an engine.

The protective means herein disclosed find particular utile application in military aircraft installations wherein a direct hit on the engine radiator, while insufficient to disable the craft, might still cause disaster due to the complete loss of the oil supply.

It is known in the art that an aircraft can effectively cruise for a great distance and for a prolonged period of time without the engine oil circulating through the radiator, for although under these conditions the oil will over-heat and lose effectiveness, lubrication will still be present, and a considerable time will elapse before the oil heats to a point of complete breakdown. This unfavorable condition is further mitigated by the fact that as the oil temperature rises, the piping, sump and other components of the oil system begin functioning as radiators, since the heat transfer from the over-heated oil to these components is rapidly accelerated.

It is, therefore, possible for the craft to continue functioning for a fair length of time, and thereby, enable the operators to reach a friendly base, or, at least, select a site for an emergency landing.

It is equally well known in the art, however, that without oil supply whatsoever, the engine will over-heat and bind in a relatively brief interval of time, thereby forcing an immediate landing.

It is, therefore, one of the objects of the present invention to provide means whereby the foregoing danger is eliminated, and to do so in a novel and effective manner.

Another object of the invention is to provide a system for an engine whereby the oil entering the cooling radiator will automatically bypass the radiator in the event of a hit thereon by a bullet or other missile.

Still another object of the invention is to provide signaling means about the radiator whereby, in the event of a puncture therein, electrical means will cause the engine oil to bypass the radiator and apprise the operators simultaneously of the condition.

Still another object of the invention is to provide protective means of the above-indicated character which will be economical to manufacture, easy to install, and yet positive and reliable in operation.

A further object of the invention is to provide protective means of the above-indicated nature which will not unduly penalize the aircraft owing to excessive weight considerations.

The foregoing and other objects and advantages will appear more fully hereinafter from a consideration of the detailed description which follows, taken together with the accompanying drawing, wherein two embodiments of the invention are illustrated by way of example. It is to be expressly understood, however, that the drawing is for the purposes of illustration only, and is not to be construed as defining the limits of the invention, reference being had for this purpose to the appended claims.

In the drawing wherein like reference character designate like parts:

Figure 1:
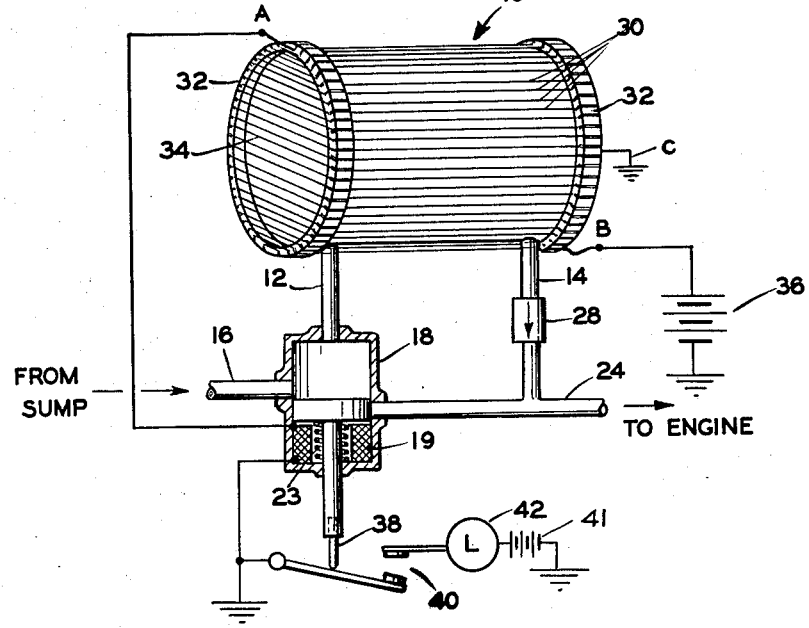
Figure 1 is a diagram of the system partly in schematic.

Referring now to the drawing, and more particularly to Figure 1, an engine oil radiator generally designated by the numeral 10 contains oil inlet 12 and oil outlet 14. A conduit 16 from the engine oil sump, not shown here, leads to a solenoid operated two-way valve 18, of the type commonly employed in the art. The valve 18 is normally held by an electromagnet 19 so as to permit the oil to flow into inlet conduit 12 and into the radiator inlet, but upon deenergizing the magnet 19, a spring 23 positions the valve 18 so that the flow of oil will be diverted to conduit 24, and thence, to the engine. The conduit 14, which normally carries the oil from the radiator 10 into the conduit 24, contains a one-way check valve 28, which will permit flow therethrough only in the direction indicated by the arrow.

A bare wire casing 30, constructed of some suitable electrical conductor, completely surrounds the radiator 10 and is supported by slotted insulators 32. Individual coils 34 of the casing 30 are spaced sufficiently close as to impede the passage of missiles therethrough, including the smallest ammunition generally employed in aircraft armament, as, for example, a projectile from a .30 caliber gun, and, in addition, are sequentially connected to form a single wire uninterrupted circuit about the radiator 10 starting from a point A and terminating at a point B.

The casing 30 is further disposed a very small distance from the radiator 10, so that in the event of being struck by a missile, the torn coils 34 of casing 30 will make contact with radiator 10 which is grounded at C.

The point A connects to the solenoid 19 of the valve 18 and thence to ground in a single wire aircraft system, wherein the ground is the return line, while the point B is connected to a source of electrical potential 36 in the craft.

A plunger 38 in the solenoid valve 18 under force of the spring 23 is adapted to close a normally open switch 40 upon de-energization of the solenoid 19 and thereby feed current from a source of electrical energy or battery 41 to a warning light 42 which is located at some point within full view of the operators of the craft.

Figure 2:
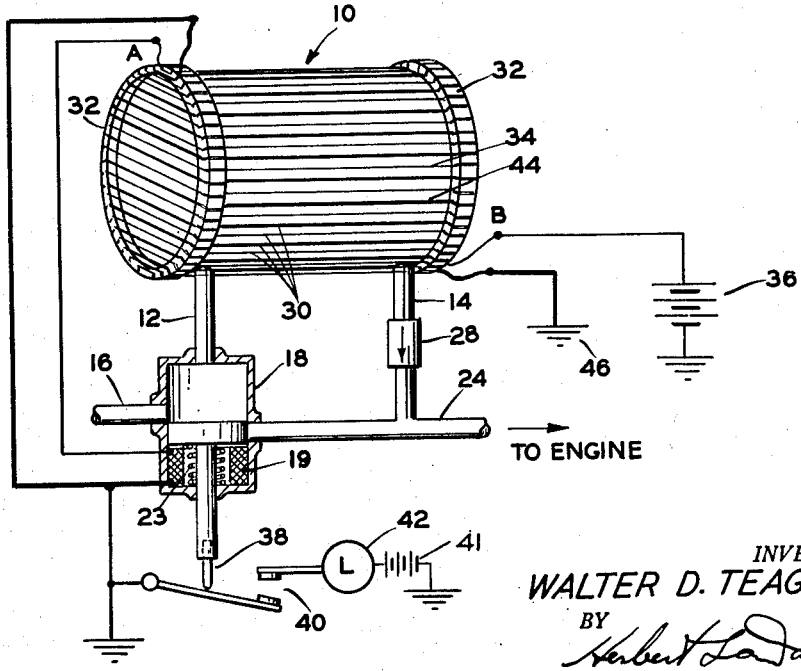
Figure 2 is a schematic diagram showing an alternate embodiment of the invention.

Referring now to Figure 2, wherein an alternate embodiment of the invention is illustrated, the coils 34 connect to the solenoid 19 from point A, and to the source of electrical potential 36 from point B, as in the previous embodiment of the invention, but ground return coils 44, not touching the coils 34 nor the radiator 10, are wound so that the casing 30 is composed of coils 34 and ground return coils 44 in alternate sequence. The ground return coils 44 are connected to the solenoid 19 on one end, and suitably grounded as at 46 on the opposite end.

Having thus described the device, in operation, it will now be apparent to those skilled in the art that when a bullet or other missile, such as shrapnel from an aerial bomb or anti-aircraft shell, strikes the radiator 10, it will first shatter at least one of the wire coils 34 of the casing 30, thereby immediately shorting out the solenoid 19 of the valve 18, and thereby actuating the valve to close conduit 12 from conduit 16 and cause the oil to by-pass the now punctured radiator 10, to the engine by means of passage 24. Simultaneously, the plunger 38 will close the switch 40 to energize the warning light 42, thereby apprising the operators of the craft of the dangerous condition.

To further insure positive operation of the device, the distance between the radiator 10 and the casing 30 is relatively small, so that a hit on the radiator will inevitably cause the portion of the casing struck to ground out the circuit against the radiator which as shown in Figure 1 is grounded at C, thereby rendering the by-pass valve 18 operative. The check valve 28 in conduit 14 obviates the possibility that oil might flow from the conduit 24 into the damaged radiator 10 while the by-pass is operative.

In this manner, the lubricant circulating through the oil system will not be lost through the punctured radiator, and a supply of lubricant will continue being supplied to the engine, which will be adequate for a reasonable period of time, as heretofore explained.

In the second embodiment of the invention, as illustrated in Figure 2, it will be apparent that by alternating each coil 34 with a ground return coil 44, the by-pass valve 18 and the warning light 42 will be rendered operative if the coils 34 and 44 are brought into contact with one another, since the solenoid 19 will thereby be grounded out.

This type of circuit negates the possibility that the casing 30 might be shattered, but loose strands of bare wire accidentally in contact with one another could complete the circuit so as to maintain the solenoid 19 energized, and, therefore, prevent the oil from by-passing the radiator, and render the warning device 42 inoperative.

There are thus provided means for protecting the oil supply of an engine in the event that the radiator is rendered inoperative by a direct hit, which are light in weight, easy and economical to install and maintain, and yet positive and reliable in operation.

Although only two embodiments of the invention have been illustrated and described, other changes and modifications in form and relative arrangement of parts, which will be apparent to those skilled in the art, may be made without departing from the spirit and scope of the invention.

What is claimed is:

1. In an engine oil system for aircraft, the combination comprising a radiator including an inlet and an outlet, a transfer valve upstream of said radiator inlet, said transfer valve having an inlet and first and second outlets, an inlet conduit connecting said transfer valve inlet to a source of oil for the engine, a first outlet conduit connecting said first transfer valve outlet to the engine, a second outlet conduit connecting said second transfer valve outlet to said radiator inlet, a solenoid normally energized to affect said transfer valve so as to close said first transfer valve outlet and open said second transfer valve outlet, an outlet line leading from said radiator outlet to the engine, check valve means in the outlet line preventing back flow from the engine to said radiator, a bare wire casing forming a continuous electrical circuit encompassing said radiator, said circuit connected to the solenoid of said transfer valve and to a source of electrical potential, and spring biasing means to operate said transfer valve so as to open said first outlet conduit and close said second outlet conduit upon the interruption of said circuit and the de-energization of said solenoid to thereby cause the oil to by-pass said radiator and flow directly to the engine.

2. In an engine oil system for aircraft, the combination comprising a radiator including an inlet and an outlet connected to the engine, a check valve in said outlet preventing back flow from the engine to said radiator, a bare wire casing surrounding said radiator, an electrical circuit including a source of electrical potential, said casing forming part of said electrical circuit, a transfer valve upstream of said radiator inlet, said valve having an inlet connected to the source of oil for the engine conduit, a first outlet connected to the engine, and a second outlet connected to said radiator inlet, said transfer valve alternately operable to connect said valve inlet to one or the other of said outlets, and operating means for said transfer valve and responsive to said circuit to cause said transfer valve to close said second outlet to said radiator inlet and open said first outlet to the engine upon the breaking of said circuit.

3. In a protective system for an aircraft engine oil system the combination comprising a radiator including an inlet and an outlet, a bare wire casing comprising alternately a live coil and a ground return coil adjacent thereto completely encasing said radiator, said coils forming an electrical circuit and being disposed to be broken upon the passage of a missile therethrough, a valve upstream of said radiator, said valve having an inlet conduit and a first outlet conduit leading to said engine and a second outlet conduit leading to said radiator inlet, a solenoid to operate said valve forming a part of said circuit and normally energized to affect said valve so as to close said first conduit and open said second conduit to permit said valve to pass flow to said radiator, an outlet conduit leading from said radiator outlet to said engine, check valve means preventing flow to said radiator inlet, a warning device controlled by said solenoid, and spring means to bias said valve so as to open said first outlet conduit to said engine and close said second conduit to said radiator operative upon contact of at least one of said live coils with one of said ground return coils to thereby deenergize said solenoid and prevent flow to said radiator and operate said warning device.

4. In an engine oil system for aircraft, the combination, a radiator including an inlet and an outlet, a valve upstream of said inlet, said valve having an inlet conduit, a first outlet conduit leading to said engine and a second outlet conduit leading to said radiator inlet, a solenoid normally energized to affect said valve so as to close said first conduit and open said second conduit, an outlet line leading from said radiator outlet to said engine, check valve means in the outlet line preventing back flow to said outlet, a bare wire casing comprising alternately a live coil and a ground return coil adjacent thereto, forming a continuous electrical circuit encompassing said radiator, said circuit connected to the solenoid of said valve and to a source of electrical potential, biasing means to operate said valve so as to open said first outlet conduit and close said second outlet conduit upon contact of at least one of said live coils with one of said ground return coils thereby causing the oil to by-pass said radiator and flow direct to said engine, a plunger on said valve, and a warning light energized by the movement of said plunger to signal the interruption of said circuit by the contact of said valve coil with said return coil.

5. In a protective system for an aircraft engine oil system, the combination comprising a radiator including an inlet and an outlet, a bare single wire casing completely encasing said radiator, said wire forming an electrical circuit and being disposed so as to be broken upon the passage of a missile therethrough, a valve upstream of said radiator inlet, said valve having an inlet connected to the source of oil for the engine and a first outlet connected to the engine and a second outlet connected to said radiator inlet, spring means biasing said valve to open said first outlet and close said second outlet, a solenoid forming a part of said circuit and operatively associated with said valve, said solenoid being normally energized to move said valve against the bias of said spring means so as to close said first outlet and open said second outlet to permit said valve to pass flow to said radiator inlet, an outlet conduit connecting said radiator outlet to the engine, check valve means in said radiator outlet conduit and preventing flow from the engine to said radiator outlet, and a warning device controlled by the position of said valve, said solenoid being de-energized upon the grounding of said wire against said radiator, said spring means being effective on the de-energization of said solenoid to move said valve to open said first outlet and to close said second outlet to thereby prevent flow to said radiator inlet and to operate said warning device.

6. In a protective system for an aircraft engine oil system, the combination comprising a radiator including an inlet and an outlet, a bare single wire casing completely encasing said radiator, said wire forming an electrical circuit and being disposed so as to be broken upon the passage of a missile therethrough, a valve upstream of said radiator inlet, said valve means having an inlet connected to the source of oil for the engine and a first outlet connected to the engine and a second outlet connected to said radiator inlet, spring means biasing said valve to open said first outlet and close said second outlet, a solenoid forming a part of said circuit and operatively associated with said valve, said solenoid being normally energized to move said valve against the bias of said spring means to close said first outlet and open said second outlet to permit said valve to pass flow to said radiator inlet, an outlet conduit connecting said radiator outlet to the engine, check valve means in said radiator outlet conduit and preventing flow from the engine to said radiator outlet, and a warning device controlled by the position of said valve, said solenoid being de-energized upon the breaking of said wire whereby said circuit is interrupted and said spring means being effective on the de-energization of said solenoid to move said valve to close said second outlet and open said first outlet to prevent flow to said radiator inlet and to operate said warning device.

WALTER D. TEAGUE, JR.

References Cited in the file of this patent

UNITED STATES PATENTS

| Number | Name | Date |
|---|---|---|
| 2,291,637 | Kohlmann | Aug. 4, 1942 |
| 2,543,652 | Weymouth | Feb. 27, 1951 |

FOREIGN PATENTS

| Number | Country | Date |
|---|---|---|
| 572,889 | Great Britain | Oct. 29, 1945 |